Sept. 8, 1970  J. W. MANOWITZ  3,527,527
MAGNIFYING OR DIMINISHING GLASS MIRROR
Filed Sept. 28, 1967  2 Sheets-Sheet 1
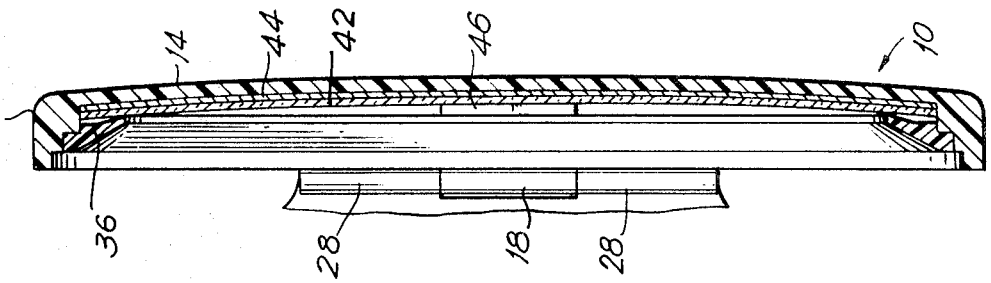
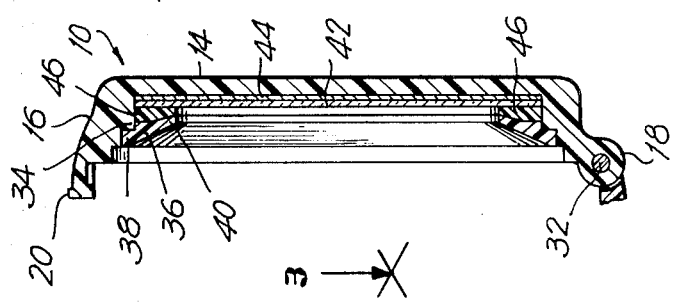
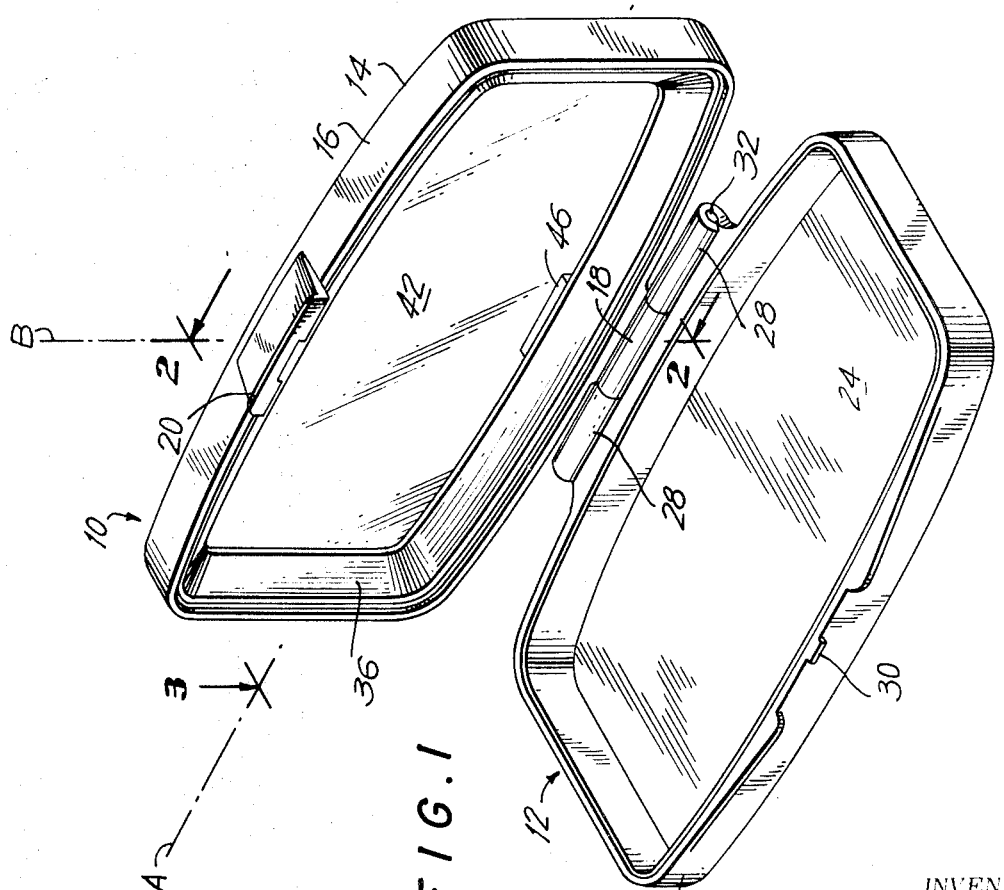
INVENTOR.
JACOB WILLIAM MANOWITZ
BY
ATTORNEY Sept. 8, 1970        J. W. MANOWITZ        3,527,527
MAGNIFYING OR DIMINISHING GLASS MIRROR
Filed Sept. 28, 1967        2 Sheets-Sheet 2
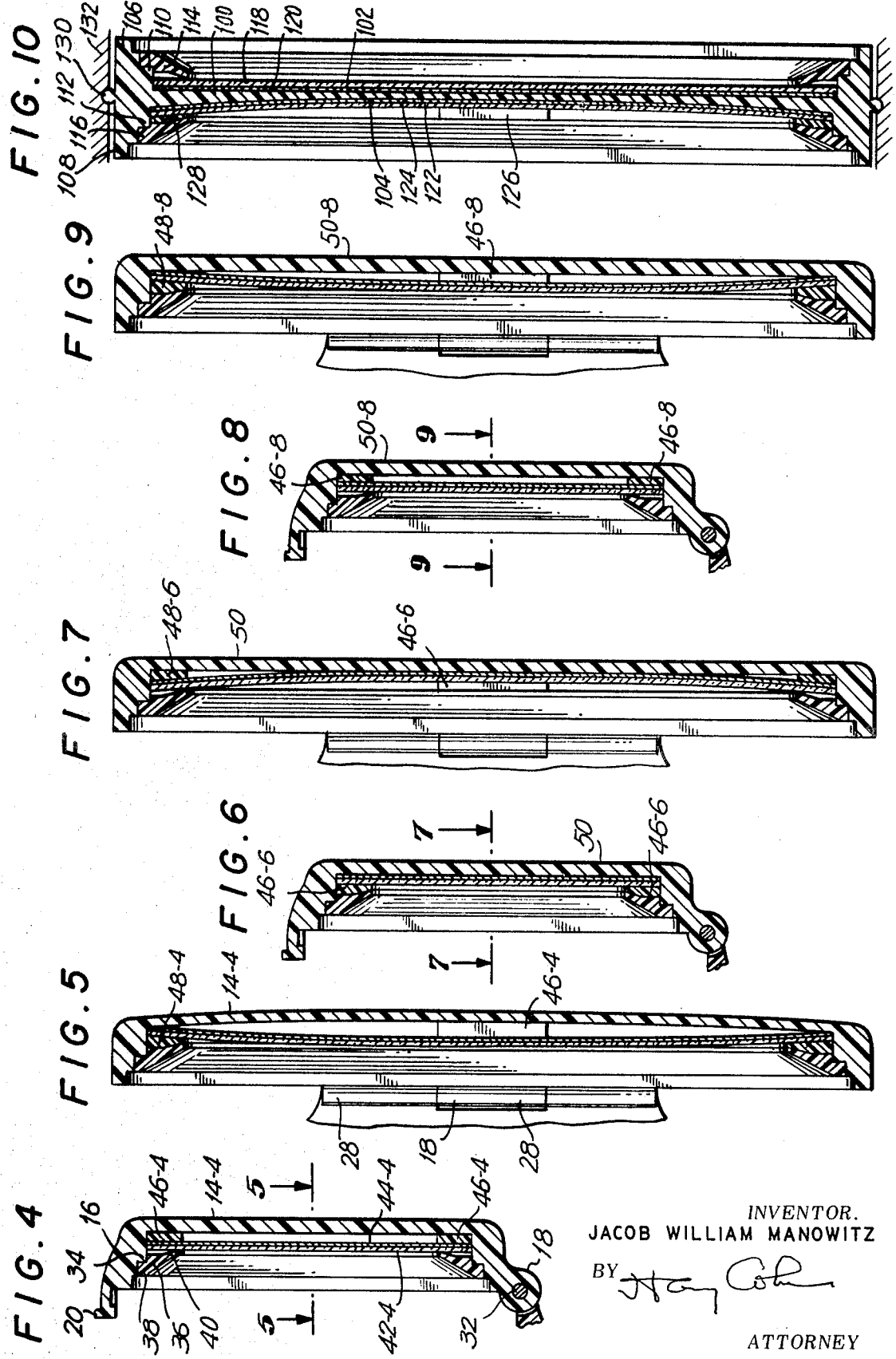
INVENTOR.
JACOB WILLIAM MANOWITZ
BY *Harry Cohen*
ATTORNEY 3,527,527
MAGNIFYING OR DIMINISHING GLASS MIRROR
Jacob William Manowitz, 83—20 141st St.,
Jamaica, N.Y. 11435
Filed Sept. 28, 1967, Ser. No. 671,445
Int. Cl. G02b 5/10
U.S. Cl. 350—295                                    5 Claims

ABSTRACT OF THE DISCLOSURE

A glass mirror assembly includes a cup shaped member serving as a support plate and an annular flange, a normally rectilinear flat mirror disposed within the cup, and a bezel frame secured within the cup to the flange and overlying the margin of the mirror. The bezel presses against said margin of the mirror and a plurality of spacing elements, variously disposed between the frame and the mirror, and/or the mirror and the plate, deflects the mirror into a concave, or convex, curvilinear shape.

BACKGROUND OF THE INVENTION

Field of the invention

This invention relates to mirrors, and especially to curvilinear mirrors which are formed by deflection from substantially rectilinear mirrors.

Prior art

Curvilinear mirrors which are formed by deflection from rectilinear mirrors have been previously proposed. In an early proposal for a camera viewing device a rectilinear mirror was held at two opposed ends by a frame whose length therebetween was shorter than the corresponding length of the mirror, whereby the mirror was deflected into a curvilinear shape. Such an arrangement places a relatively large stress on the mirror. In a more recent proposal for a solar mirror assembly, each of a plurality of rectangular mirrors is deflected by three adjustment screws overlying the rear surface of the mirror and three adjustment screws overlying the front surface of the mirror. Obviously, such an arrangement obscures at least part of the image reflected by the mirror.

SUMMARY OF THE INVENTION

It is an object of this invention to provide a curvilinear mirror with a minimum of stress and without any obscuring of the image reflected by mirror; and which is especially adapted for incorporation in a lady's compact or hand mirror.

The principle of the invention may be incorporated in a mirror assembly comprising a support plate having an upstanding annular flange, a normally rectilinear mirror disposed over said plate within said flange, a bezel frame fixed to the distal part of said flange and overlying said mirror; a first pair of spaced apart spacing elements respectively disposed along a first axis and between said plate and two opposed marginal portions of said mirror; and a second pair of spaced apart spacing elements respectively disposed along a second axis which is perpendicular to said first axis and between said bezel frame and two additional opposed marginal portions of said mirror.

BRIEF DESCRIPTION OF THE DRAWING

These and other objects, features and advantages will become apparent from the following specification thereof taken in conjunction with the accompanying drawing in which:

FIG. 1 is a perspective view of a lady's compact incorporating a curvilinear mirror embodying the principles of this invention;

FIG. 2 is an end view in cross-section of the compact of FIG. 1 taken along the plane suggested by line 2—2, and showing a concave mirror in a concave case;

FIG. 3 is a front view in cross-section of the compact of FIG. 1 taken along the plane suggested by line 3—3, and showing a concave mirror in a concave case;

FIG. 4 is an end view in cross-section of a compact similar to that of FIG. 1, showing a convex mirror in a concave case;

FIG. 5 is a front view in cross-section of the compact of FIG. 4 taken along the plane suggested by line 5—5, and showing a convex mirror in a concave case;

FIG. 6 is an end view in cross-section of a compact similar to that of FIG. 1, showing a concave mirror in a flat case;

FIG. 7 is a front view in cross-section of the compact of FIG. 5 taken along the plane suggested by line 7—7, and showing a concave mirror in a flat case;

FIG. 8 is an end view in cross-section of a compact similar to that of FIG. 1, showing a convex mirror in a flat case;

FIG. 9 is a front view in cross-section of the compact of FIG. 8 taken along the plane suggested by line 9—9, and showing a convex mirror in a flat case; and FIG. 10 is a view in cross-section of a hand mirror incorporating a convex mirror and a concave mirror, both embodying the principles of this invention.

DESCRIPTION OF THE PREFERRED EMBODIMENTS

The mirror assembly is shown in FIG. 1 as incorporated in a lady's compact. The compact includes a cover 10 and a base 12. The cover includes a top or support plate 14 which has an upstanding annular flange 16. The external rear face of the flange 16 has a barrel part 18 molded integrally therewith, and the external front face of the flange 16 has a snap part 20 molded integrally therewith. The base includes a bottom or support plate 24 which has an upstanding annular flange 26. The external rear face of the flange 26 has two spaced apart barrels 28 molded integrally therewith, and the external front face of the flange 26 has a snap part 30 molded integrally therewith. The three barrels, together with a pin 32, form a hinge for the compact, while the two snap parts serve as a catch for the compact.

The inner face of the flange 16 has at least one step 34 molded therein. A flat bezel frame 36, having, in cross-section, a stepped heel part 38 and a depending toe part 40 is secured onto the stepped inner face of the flange 16 by suitable means, such as a solvent, adhesive, heat sealing or ultra-sonic welding applied to the mating faces of the flange and the bezel. The base, cover and bezel may each be made of a suitable, relatively rigid, plastic. A normally flat, thin piece of silvered glass 42 is disposed between the support plate 14 of the cover and the bezel frame, and serves as a mirror.

A die cut backing paper 44 may be disposed between the glass and the support plate.

A curvature along one axis may be formed into the flat piece of glass by one of several arrangements. As shown in FIGS. 1, 2 and 3, the support plate 14 is flat about its lateral axis B, and is concave upwardly about its longitudinal axis A. Two spaced apart, spacing elements or shims 46 are disposed along the longitudinal axis A, between the bezel frame and the glass. The two spacing elements are constrained by the bezel frame 36, which is reinforced by the flange 16, to deflect the central portion of the glass downwardly along the longitudinal axis A against the the laterally curved support plate 14, while the lateral parts of the glass are clamped between the bezel frame and the support plate, to form a concave upwardly curvature in the glass B, conforming to the curve of the support plate. The spacing elements may be made of any suitable construction, but, advantageously, are covered by the bezel frame and do not obscure the mirror.

As shown in FIGS. 4 and 5, a similar apparatus may be utilized to provide a convex upwards curvature. Here, the case also has a support plate 14 which is concave upwardly about the longitudinal axis A. However, here the spacer elements 46–4 are disposed along the longitudinal axis between the glass plate 42–4 and the support plate 14–4, so as to deflect the central portion of the glass plate upwardly along the longitudinal axis A against the flat bezel frame. Further two additional spacer elements 48–4 are disposed along the lateral axis A between the bezel frame and the glass plate to deflect the lateral parts of the glass plate downwardly against the support plate.

In lieu of the curved support plate 14 shown in FIGS. 2–5, a flat support plate 50 may be utilized. As shown in FIGS. 6 and 7, a concave upwards curvature may be provided in the mirror. Here, two spacer elements 46–6 are disposed along the lateral axis B between the bezel frame and the glass plate to deflect the central part of the glass plate downwardly along the longitudinal axis A against the support plate 50. Two spacer elements 48–6 are disposed along the lateral axis A between the glass plate and the support plate to deflect the lateral parts of the glass plate upwardly against the bezel frame. As a result, the glass is deflected into a concave upwards mirror.

As shown in FIGS. 8 and 9, a convex upwards curvature may be provided in the mirror. Here, two spacing elements 46–8 are disposed along the longitudinal axis A between the glass plate and the support plate to deflect the central part of the glass plate upwardly against the bezel frame. Two spacing elements 48–8 are disposed along the longitudinal axis A between the bezel frame and the glass plate to deflect the lateral parts of the glass plate downwardly against the support plate. As a result, the glass plate is deflected into a convex upwards mirror.

A similar arrangement is shown in FIG. 10 to provide a two faced rectangular hand mirror assembly. Here, the support plate 100 is provided with a flat surface 102 and a surface 104 which is concave about a vertical central axis and that about a horizontal central axis. The support plate has an annular flange with a portion 106 upstanding from the surface 102, and a portion 108 upstanding from the surface 104. The flange portion 106 includes a step 110, and the flange portion 108 includes a step 112. A bezel frame 114 is secured to the step 110 and a bezel frame 116 is secured to the step 112. A silvered glass plate 118, with a backing paper 120, is clamped between the bezel frame 114 and the surface 102 of the support plate, to provide a flat mirror. A silvered glass plate 122, with a backing paper 124, is disposed between the bezel frame 116 and the surface 104. Two spacer elements 126 are disposed along the horizontal axis between the bezel frame and the glass plate to deflect the glass plate against the surface 104. Two spacer elements 128, if required by the spacing between the bezel frame and the high portions of the concave surface 104, are disposed along the vertical axis between the bezel frame and the glass plate to ensure the overall deflection of the glass plate against the surface 104, thereby providing a concave mirror. The annular flange may be provided with an annular bead 130 whereby the mirror assembly may be snapped into a mating groove in a suitable frame or handle 132.

It will be appreciated that while the several spacer elements have been illustrated as independent parts, they may conveniently be molded integrally with the bezel frame or the support plate, as may be appropriate. The higher lateral portions of the concave support plate shown in FIG. 3 will be seen to be the equivalent of spacer elements, taken with respect to the lower central portion of the support plate.

In a commercial embodiment a substantially rectangular mirror is utilized, having a dimension along the lateral axis A of 4⅜ inches, a dimension along the longitudinal axis B of 2 inches, and a thickness of .044 inch. The spacing elements of FIG. 1 were made .04 inch thick.

What is claimed is:

1. A compact or vanity case comprising: a receptacle part; a cover part movably connected to said receptacle part; an initially flat-planar, glass mirror disposed in said cover part; and means engaging said mirror at spaced edge portions thereof and thereby deflecting said mirror into a curvilinear configuration, said last mentioned means including a first pair of spaced apart spacing means respectively disposed along a first axis and between said support plate and two opposed marginal portions of said mirror; a second pair of spaced apart spacing means respectively disposed along a second axis which is perpendicular to said first axis and between a bezel frame and two additional opposed marginal portions of said mirror; said bezel frame being fixed to the distal part of said flange and exerting a force against parts of said mirror and acting in conjunction with said two pairs of spacing means and thereby curving said plate about one of said axes.

2. A compact or case according to claim 1 wherein said bezel frame overlies the marginal edge portion of said mirror and at least part of said mirror deflecting means is disposed between said frame and underlying portions of said mirror at the front thereof.

3. A compact or case according to claim 1 wherein said bezel frame overlies the marginal edge portion of said mirror and carries at least part of said mirror deflecting means.

4. A compact or case according to claim 1 wherein said cover part has an inner concave surface, one of said pairs of spacing means is disposed between said bezel and the front of mirror whereby said mirror is deflected into concave form at the front thereof, the laterally spaced apart edge portions parallel to said first axis serving as said first pair of spacing means.

5. A compact or vanity case comprising: a receptacle part; a cover part movably connected to said receptacle part; an initially flat-planar, glass mirror disposed in said cover part; and means engaging said mirror at spaced edge portions thereof and thereby deflecting said mirror into a curvilinear configuration, said last mentioned means including a first pair of spaced apart spacing means respectively disposed along a first axis and between said support plate and two opposed marginal portions of said mirror; a second pair of spaced apart spacing means respectively disposed along a second axis which is perpendicular to said first axis and between a bezel frame and two additional opposed marginal portions of said mirror; said bezel frame being fixed to the distal part of said flange and exerting a force against parts of said mirror and acting in conjunction with said two pairs of spacing means and thereby curving said plate about one of said axes and one of said pairs of spacing means is disposed between said support plate and the back of said mirror whereby said mirror is deflected into convex form at the front thereof.

References Cited

UNITED STATES PATENTS

| | | | |
|---|---|---|---|
| 3,004,472 | 10/1961 | Buxton | 350—295 |
| 1,576,953 | 3/1926 | Donahue | 132—83.6 |
| 1,866,162 | 7/1932 | Hall | 132—79.8 |
| 3,006,252 | 10/1961 | Kacowski | 350—296 |
| 3,019,710 | 2/1962 | Bean | 350—296 |

FOREIGN PATENTS

| | | |
|---|---|---|
| 101,472 | 1899 | Germany. |
| 400,445 | 1933 | Great Britain. |
| 974,847 | 1964 | Great Britain. |

DAVID SCHONBERG, Primary Examiner

J. W. LEONARD, Assistant Examiner

U.S. Cl. X.R.

132—83; 350—293, 296